US006377433B1

(12) United States Patent
Condon et al.

(10) Patent No.: US 6,377,433 B1
(45) Date of Patent: Apr. 23, 2002

(54) ELECTRICAL FUSE/SUPPORT ASSEMBLY

(75) Inventors: Nancy J. Condon, Torrance; Edward K. Hoffman, Anaheim; John P. Stafford, Yorba Linda, all of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/528,074

(22) Filed: Mar. 17, 2000

(51) Int. Cl.[7] .................................................. H02H 5/04
(52) U.S. Cl. ........................ 361/104; 361/748; 337/297
(58) Field of Search ......................... 361/104, 748–812; 174/250–268; 337/297

(56) References Cited

U.S. PATENT DOCUMENTS 2,874,248 A * 2/1959 Tondat et al. ............... 337/284
2,941,059 A * 6/1960 Sims et al. ................. 337/187
4,296,398 A * 10/1981 McGalliard ................. 337/297
4,342,977 A * 8/1982 McGalliard ..................... 337/4
4,376,927 A * 3/1983 McGalliard ................. 337/297
4,394,639 A * 7/1983 McGalliard ................. 337/292
4,477,857 A * 10/1984 Crocker ...................... 361/119
4,652,848 A * 3/1987 Hundrieser ................. 337/297
4,962,363 A * 10/1990 Sexton, Jr. .................. 337/186
5,148,141 A * 9/1992 Suuronen .................... 337/297
5,401,913 A * 3/1995 Gerber et al. ............... 174/264
5,471,163 A * 11/1995 Childers ..................... 327/525

* cited by examiner

*Primary Examiner*—Kim Huynh

(57) ABSTRACT

A fuse/support assembly for attachment to an electrical bus includes a base plate having a substrate made of an insulator, a fastener bore extending through the substrate, and an electrically conductive path on the substrate. There is additionally an external connector structure. A fuse is supported on the substrate and has a first end in electrical communication with the external connector and a second end in electrical communication with the electrically conductive path.

20 Claims, 4 Drawing Sheets

ELECTRICAL FUSE/SUPPORT ASSEMBLY

BACKGROUND OF THE INVENTION

This invention relates to electrical fuses, and, more particularly, to a fuse/support assembly that permits the convenient utilization of electrical fuses in instrumentation applications.

In many applications, the components of an electrical system are protected against damage from excessive electrical currents by an electrical fuse. The electrical fuse is connected with the electrical system such that any excessive electrical current causes the electrical fuse to change from a closed to an open circuit, preventing the excessive electrical current from passing through and damaging the remainder of the electrical circuit elements. In a typical case, the electrical fuse is connected in series with the components being protected, and includes a fuse link made of a material which heats and melts when the excessive electrical current is applied, thereby breaking the electrical circuit.

The mounting and support of the electrical fuse, and its connection into the electrical system being protected, must be accomplished in a suitable manner. In some electrical systems, such as found in some spacecraft and aircraft, the electrical fuse is externally connected between an electronic unit and an electrical bus. The existing approach to supporting and connecting the electrical fuse utilizes terminal boards to which the electrical fuse is wired, and hand-wired pigtails that extend to the electrical bus and to the electronic unit. This approach requires numerous parts which can be lost as foreign objects into the interior of the structure, and also involves extensive pre-wiring and wire attachments. Rework and repair are difficult for the same reasons.

Accordingly, there is a need for an improved approach to the mounting and interconnecting of an electrical fuse into an electrical system. The present invention fulfills this need, and further provides related advantages.

SUMMARY OF THE INVENTION

The present invention provides a fuse/support assembly and a method for its use, for systems wherein an electronic unit is connected to an electrical bus through the electrical fuse. The fuse/support assembly requires no pre-wiring of the electrical bus and reduces the number of terminations at the point of installation. The number of components required to accomplish the fusing is reduced as compared with prior approaches. Installation, rework, repair, and inspection are all simplified as compared with prior approaches, and there is reduced likelihood of loss of parts and resulting foreign object damage of the system. The close contact of the fuse/support assembly to the electrical bus allows the electrical bus to serve as a heat sink and stabilize the fuse/support assembly to prevent a premature activation of the fuse.

In accordance with the invention, a fuse/support assembly for attachment to an electrical bus comprises a base plate, comprising a substrate made of an insulator and having a contact location thereon, and an electrically conductive path on the substrate, with the electrically conductive path extending between the contact-location and a second location. A fastener structure brings the contact location of the electrically conductive path into contact with the electrical bus. There is an external connector structure. A fuse is supported on the substrate, with a first side in electrical communication with the external connector and a second side in electrical communication with the second location of the electrically conductive path.

This approach simplifies the electrical fuse protection of electrical systems, where the fuse is mounted exterior to the components being protected. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
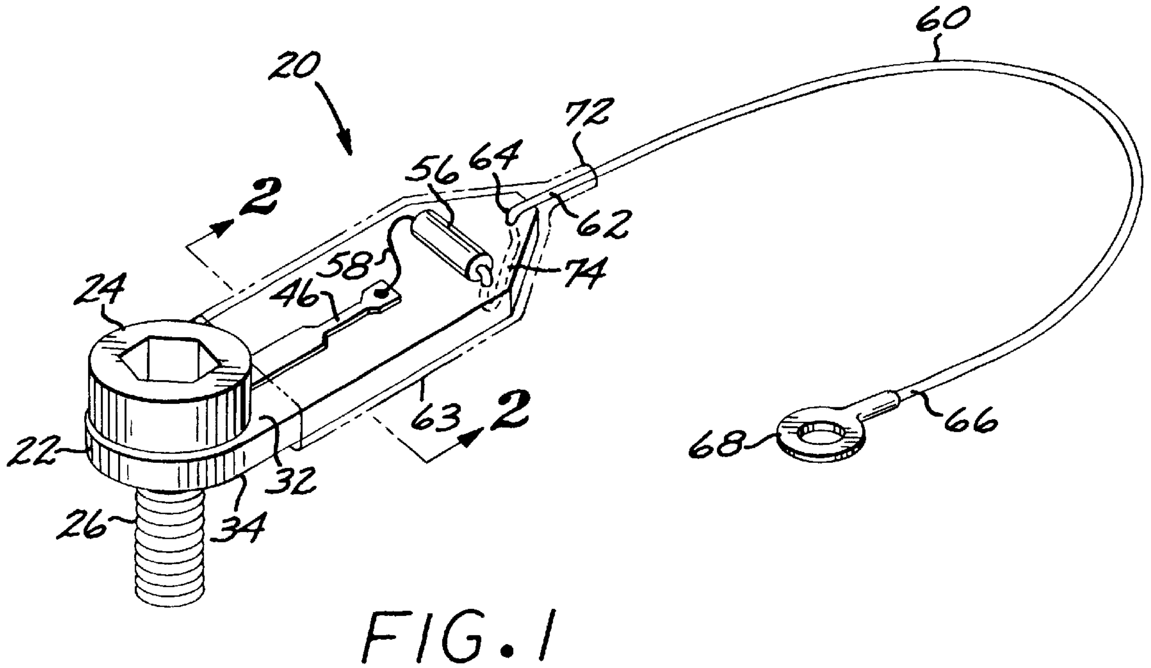
FIG. 1 is a perspective view of a fuse/support assembly according to the invention.
Figure 2:
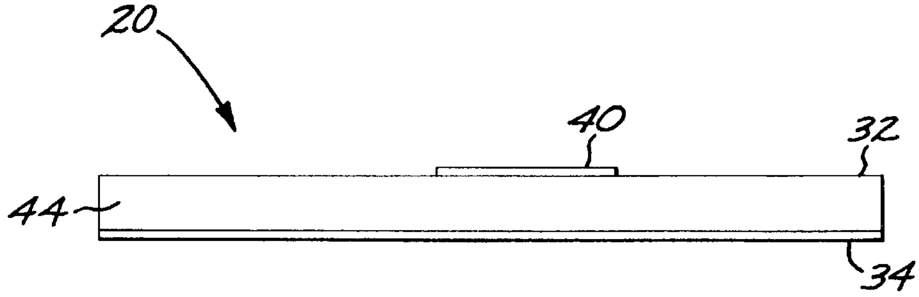
FIG. 2 is a schematic sectional view of the fuse/support assembly of FIG. 1, taken on line 2—2.
Figure 3:
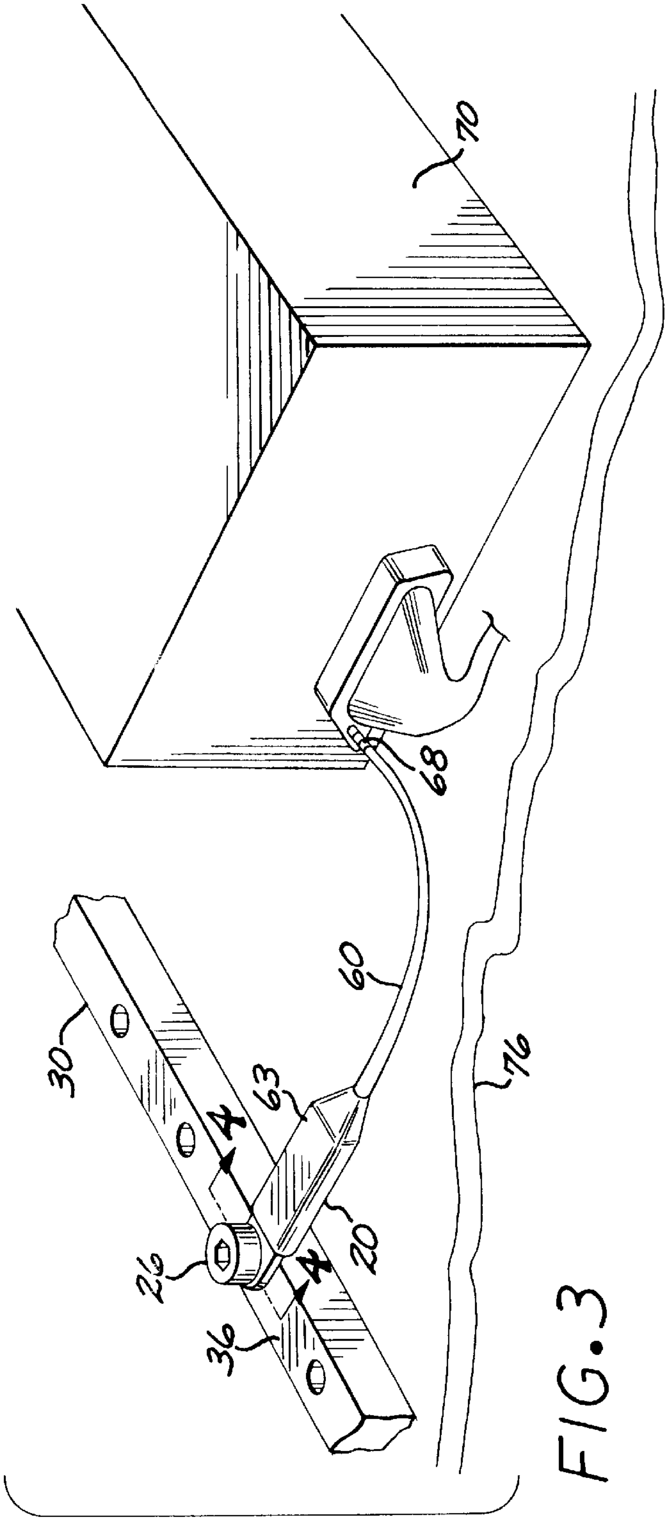
FIG. 3 is a perspective view of the installation of the fuse/support assembly in an electrical system.
Figure 4:
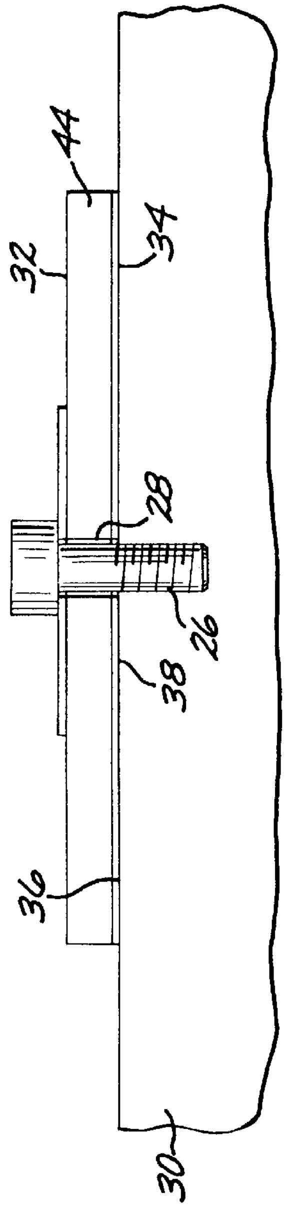
FIG. 4 is a schematic sectional view of the attachment of the fuse/support assembly to the electrical bus, taken on line 4—4 of FIG. 3.
Figure 5:
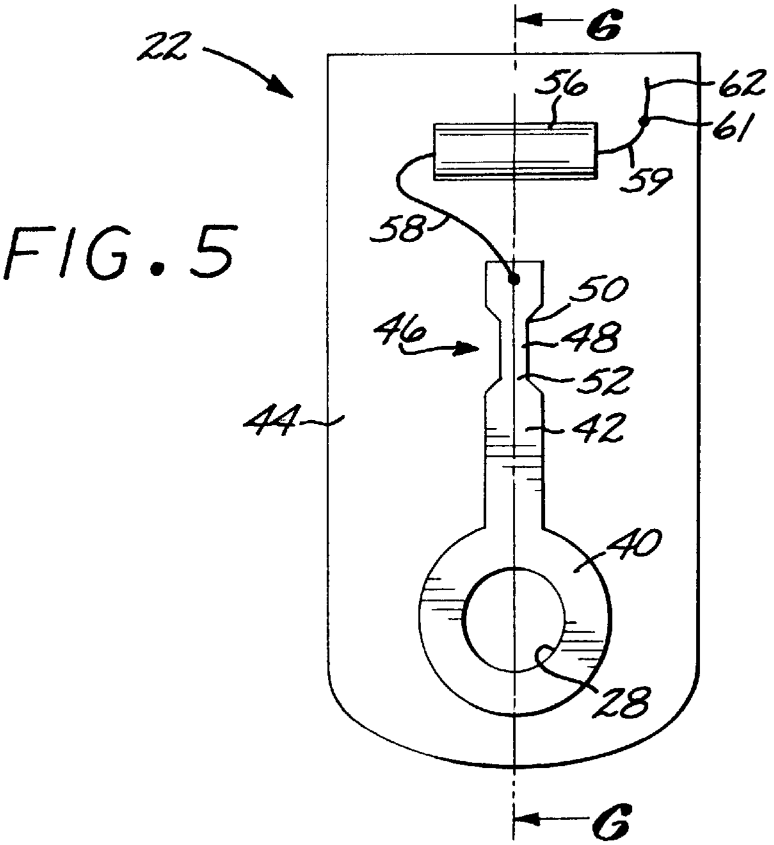
FIG. 5 is a plan view of one embodiment of the fuse/support assembly.
Figure 6A:
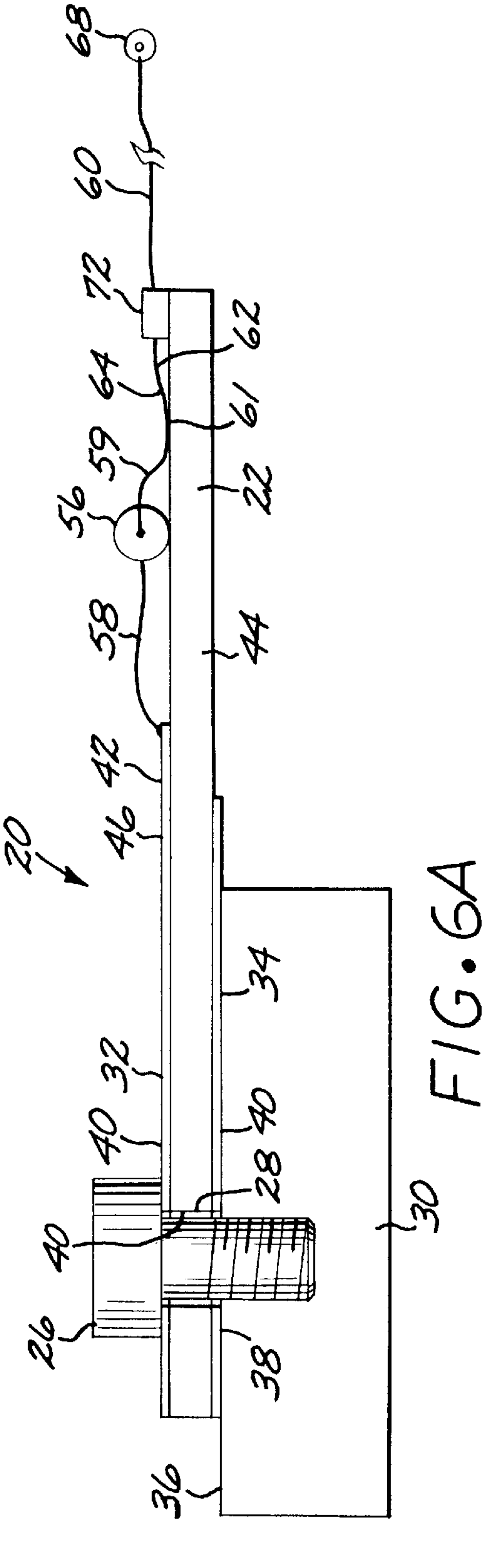
FIG. 6A is a schematic sectional view of the fuse/support assembly of FIG. 5, taken on line 6—6.
Figure 6B:
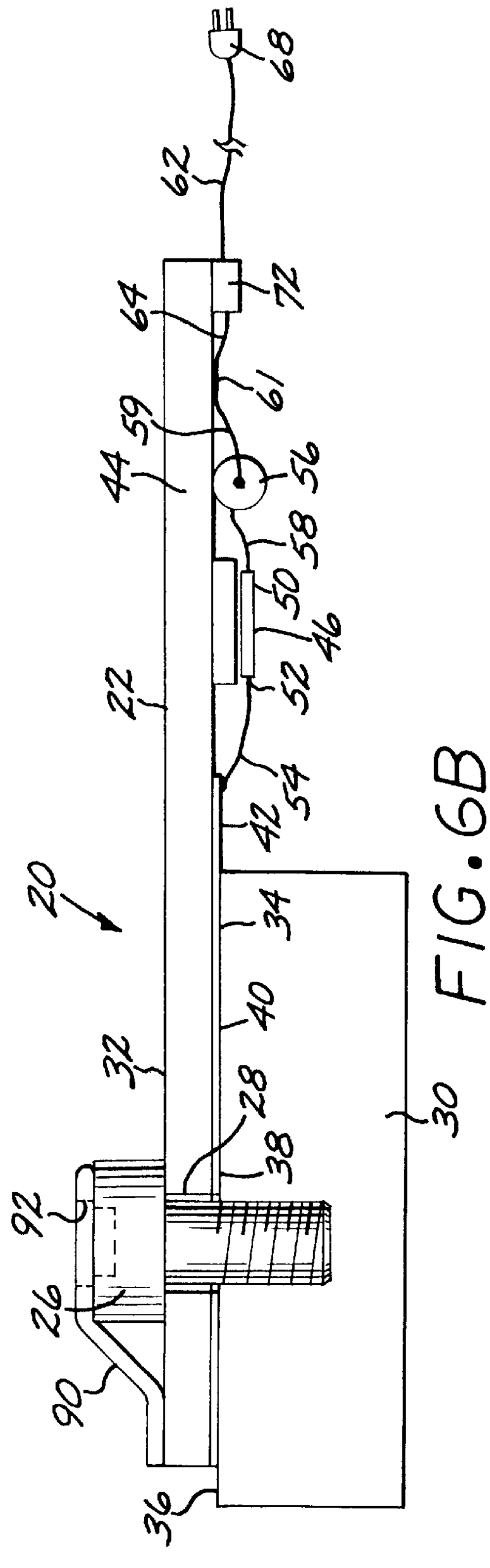
FIG. 6B is a schematic sectional view of a second embodiment of the fuse/support assembly, taken in the same view as FIG. 6A.

FIG. 1 depicts a fuse/support assembly 20 according to the invention, and FIG. 3 shows the installation of the fuse/support assembly. FIGS. 2 and 4 are sectional views through FIGS. 1 and 3, respectively. FIG. 5 is a plan view of the embodiment of FIG. 1. FIG. 6A shows the electrical circuitry associated with the fuse/support assembly and its protection of an electrical system, and FIG. 6B illustrates a second embodiment.

Referring to FIG. 1, a base plate 22 is made of an electrical insulator such as a polyimide polymer. The base plate 22 is a generally rectangular, thin plate, with the edges and ends rounded. The base plate 22 is adapted for engagement by means of a fastener 24. In the preferred approach, a fastener bore 28 (FIG. 4) passes through the thickness of the base plate 22. The fastener 24 is preferably a bolt 26 which is dimensioned to extend through the fastener bore 28, and is threadably engaged to an electrical bus 30.

The base plate 22 has a first side 32 and a second side 34. The engagement of the base plate 22 to the electrical bus 30 by the bolt 26 presses a contact location 38 of the second side 34 of the base plate 22 against a top surface 36 of the electrical bus 30, to establish an electrically conductive contact therebetween.

An electrically conductive path 40 is formed on the surface of the base plate 22, extending from the contact location 38 to a second location 42. The positioning of the second location 42 depends upon the site chosen for the fuse, as will be discussed subsequently. The electrically conductive path 40 is preferably formed as a plated metallic layer of a metal, such as copper, copper/silver, or aluminum, on the electrically nonconductive substrate 44 of the base plate 22. The fabrication of electrically insulative substrates with patterned metallic layers thereon is well known in the art for other applications, such as the fabrication of printed circuit boards. In a typical case, the base plate 22 is about 0.040 inch thick, and the metallic layer of the electrically conductive path 40 is about 0.015 inch thick.

A fuse 46 is supported on the base plate 22. The fuse 46 may be of any operable type. In the embodiment illustrated in FIGS. 1, 5, and 6A, the fuse 46 is a "thin-film fuse" and includes a length 48 of the plated metallic layer having a reduced cross-sectional area (e.g., narrowed width but constant thickness in the illustration) and other portions of which serve as the electrically conductive path 40. The fuse 46 has a first end 50 and a second end 52. In this embodiment, the second end 52 is continuous with the second location 42 of the electrically conductive path 40. In a second embodiment illustrated in FIG. 6B, the fuse 46 is a discrete element, and the second end 52 is joined to the second location 42 by a soldered or spot welded wire 54. In these embodiments, the material and crosssectional area of the fuse 46 are selected so that the fuse melts when there is an attempt to pass an electrical current greater than a permitted maximum current through the fuse.

In another variation illustrated in FIG. 6B, the fastener, in this case the bolt 26, may be captured as an integral part of the fuse/support assembly 20 by a retainer 90. The retainer 90 is preferably an electrical insulator affixed to the base plate 22 and capturing the head of the bolt 26 between the retainer 90 and the base plate 22. The retainer 90 has an opening 92 therethrough aligned with the top of the head of the bolt 26, so that an appropriate tool may be used to turn and tighten the bolt 26. The bolt 26 is assembled to the base plate 22 and captured by the retainer 90 prior to installation to the electrical bus 30, so that the bolt 26 cannot separate from the base plate 22 and fall into the interior of the electrical system.

The fuse 46 may be positioned on the first side 32 or on the second side 34 of the base plate 22. If the fuse 46 is on the first side 32, as illustrated in FIG. 6A, the electrically conductive path 40 extends from the contact location 38 on the second side 34, through the thickness of the base plate 22, and on the first side 34 to the second location 42 on the first side 32. The portion of the conductive path 40 that extends through the thickness of the base plate may extend through the fastener bore 28 as a plated layer on the surface of the bore that is continuous with the plated layer on the second side 34 and the plated layer on the first side 32. Equivalently, other through conductors such as a separate plated or filled via, or electrical plating over the edges of the base plate 22, may be used. If, on the other hand, the fuse 46 is on the second side 34, the conductive path 40 need only reside on the second side. In this case, the conductive path 40 extends from the contact location 38 along the second side 34 to the second location 42.

A ballast resistor 56 may optionally be arranged in electrical series with the electrical fuse 46. The ballast resistor 56 is normally on the same side of the base plate 22 as the electrical fuse 46, although it may be on the reverse side. A first end of the ballast resistor 56 is connected to the first end 50 of the fuse 46 with a wire 58, which is normally integral with the resistor 56 and soldered or welded to the first end 50. In the illustrated embodiments, the ballast resistor 56 is electrically positioned with the fuse 46 between the ballast resistor 56 and the contact location 38. Equivalently, the ballast resistor 56 may be positioned between the fuse 46 and the contact location 38. A wire 59 extending from the second end of the ballast resistor 56 is desirably affixed to the surface of the insulating substrate 44 of the base plate 22 to form an external electrical contact 61.

This preferred embodiment has a single fuse 46 and its associated circuitry. More than one fuse and its associated circuitry may be positioned on a single base plate 22.

An insulator may be positioned over the portion of the length of the base plate 22 that includes the fuse 46 and the resistor 56, to prevent contact of dirt and electrically shorting material to the circuitry, and to prevent injury to workers. A sleeve 63 of an insulating material such as an electrically nonconducting elastomer may be conveniently used as the insulator.

An electrical connector structure 60 is a length of an externally insulated electrical conductor 62 having a first end 64 in electrical communication with the external electrical contact 61, and a second end 66 with an external electrical connector 68 thereon. The electrical connector structure 60 is preferably in the form of a flexible conductive pigtail joined at the first end 64 to the external electrical contact 61 and having the free second end 66 with the external electrical connector 68 that is connectable to an electrical unit 70 to be protected. The external electrical connector 68 may be of any operable type, such as a spade connector, a pin connector, or the like, suitable for attaching to the corresponding location on the electrical unit 70.

The base plate 22 desirably includes a retainer clamp 72 at the end remote from the fastener bore 28. The retainer clamp 72 grasps the external surface of the insulated electrical conductor 62, so as to leave some slack in the electrical conductor 62 between the retainer clamp 72 and the external electrical contact 61. This retainer clamp 72 thus prevents the electrical conductor 62 from being broken free of the external electrical contact 61, and also provides for a strain relief 74 in the electrical conductor 62.

In a typical situation, the electrical unit 70 and the electrical bus 30 are mounted to a shelf 76. The fuse/support assembly 20 extends between the appropriate connector on the electrical unit 70 and the electrical bus 30, as shown in FIG. 3. In a production setting, the fuse/support assembly 20 may be provided in the illustrated form with the electrical connector structure 60 as a pigtail of length greater than required, and without the external electrical connector 68 being attached to the electrical conductor 62. When the connection is to be made, the electrical conductor 62 is trimmed to the required length, the external electrical connector 68 is attached to the trimmed electrical conductor 62 by crimping or soldering or other operable technique, and the external electrical connector 68 is plugged into the appropriate location on the electrical unit 70.

FIGS. 6A–6B depict the electrical path between the external electrical connector 68, and thence the electrical unit 70 being protected when the external electrical connector 68 is attached to the electrical unit 70, and the electrical bus 30. The electrical path is through the external electrical connector 68, the electrical conductor 62, the wire 59, the ballast resistor 56, the wire 58, the fuse 46, and the electrically conducting path 40. When the current in this path becomes too high for any reason, the electrical fuse 46 activates ("blows") to break with electrical path and prevent damage to the electrical unit 70.

Figure 7:
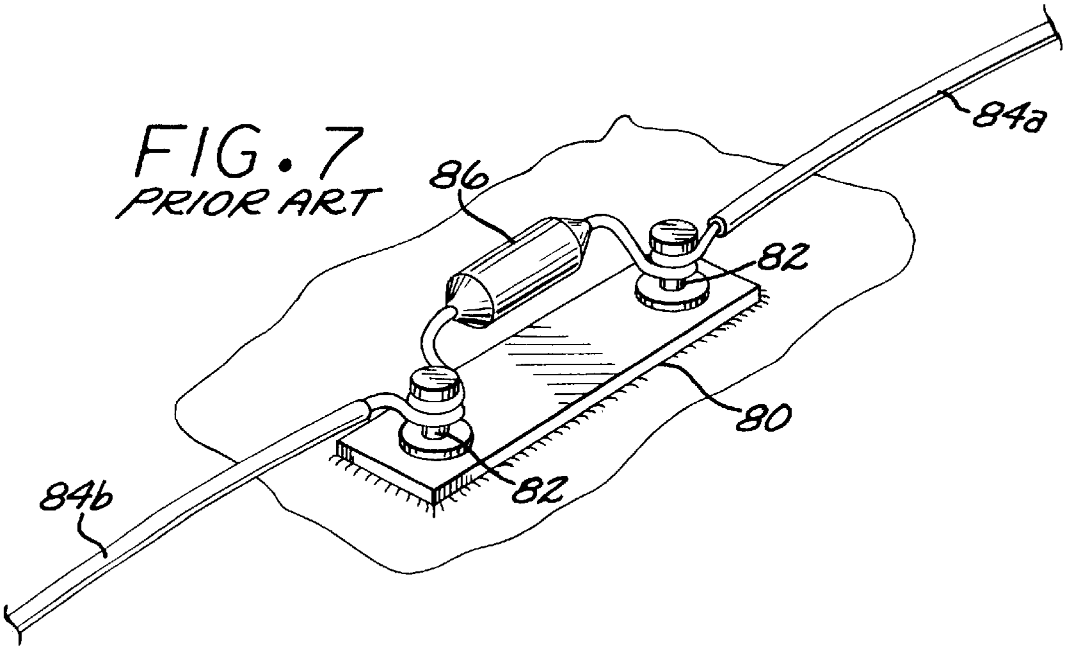
FIG. 7 PRIOR ART
FIG. 7 is a perspective view of a prior art fuse/support assembly.

The present approach is to be contrasted with the conventional approach used to protect electrical units, as shown in FIG. 7. In this conventional approach, a terminal board 80 with two posts/screws 82 is provided. Pigtails 84*a* and 84*b* extend respectively to the electrical unit and to the electrical bus. The electrical conductor ends of the pigtails are wound around the posts and secured with the screws. A fuse/ballast assembly 86 has wires extending from the ends thereof, which are also wrapped around the posts and secured with the screws. This arrangement involves more loose parts, which must be manufactured and provided, and each of which have the potential for being dropped and lost during assembly, than does the present approach. There is more pre-wiring and hard wiring required during assembly, and there is a greater chance for a mistake in wiring, than with the present approach. Reworking, repair, and replacement are easier with the present approach. The present approach is also more easily inspected during assembly.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A fuse/support assembly for attachment to an electrical bus having a surface, the fuse/support assembly comprising:

a base plate, comprising a substrate made of an insulator and having a first side and a second side, a fastener bore extending through the substrate, a threaded fastener extending through the fastener bore, and an electrically conductive path on the substrate, the electrically conductive path including a contact location on the second side of the substrate positioned such that an engagement of the base plate to the electrical bus by the threaded fastener presses the contact location against the surface of the electrical bus to establish an electrically conductive contact therebetween;

an external connector structure comprising an external electrical contact on the base plate, and a pigtail connector joined at a first end thereof to the external electrical contact and having an electrical connector at a second end thereof; and a fuse supported on the substrate and having a first end in electrical communication with the external connector structure and a second end in electrical communication with the electrically conductive path.

2. The fuse/support assembly of claim 1, further including a retainer for the fastener, the retainer being affixed to the base plate and operable to retain the fastener in contact with the base plate when the base plate is not affixed to the electrical bus.

3. The fuse/support assembly of claim 1, wherein the fastener is a threaded bolt.

4. The fuse/support assembly of claim 1, wherein the fuse/support assembly further includes a ballast resistor mounted to the substrate and in electrical series with the fuse.

5. The fuse/support assembly of claim 1, further including an insulator extending over at least a portion of the substrate.

6. The fuse/support assembly of claim 1, wherein the external connector structure comprises a pigtail connector comprising a length of electrically conductive wire having a first end in electrical communication with the fuse and a second end having an external electrical connector.

7. The fuse/support assembly of claim 1, wherein the electrically conductive path extends from the first side to the second side and comprises a first electrically conductive region on the first side, a second electrically conductive region on the second side, and an electrical through-conductor extending between the first region and the second region, and wherein the fuse is on the first side of the substrate.

8. The fuse/support assembly of claim 1, wherein the fuse is mounted to the second side of the substrate, and the electrically conductive path is on the second side of the substrate.

9. The fuse/support assembly of claim 1, wherein the fuse is a thin-film fuse.

10. The fuse/support assembly of claim 1, wherein the fuse is a discrete element.

11. A fuse/support assembly for attachment to an electrical bus, comprising:

a base plate, comprising a substrate made of an insulator and having a contact location thereon, and an electrically conductive path on the substrate, the electrically conductive path extending between the contact location and a second location, wherein the electrically conductive path comprises a first electrically conductive region on a first side of the substrate and including the second location of the electrically conductive path, a second electrically conductive region on a second side of the substrate and including the contact region, and an electrical through-conductor extending between the first electrically conductive region and the second electrically conductive region;

a fastener structure which brings the contact location of the electrically conductive path into contact with the electrical bus;

an external connector structure; and a fuse supported on the substrate and having a first end in electrical communication with the external connector and a second end in electrical communication with the second location of the electrically conductive path wherein the fuse is affixed to the first side of the substrate.

12. The fuse/support assembly of claim 11, wherein the fastener structure comprises a fastener bore extending through the substrate, and a fastener sized to extend in part through the fastener bore of the substrate.

13. The fuse/support assembly of claim 11, wherein the fastener structure includes a fastener, and a retainer for the fastener, the retainer being affixed to the base place and operable to retain the fastener in contact with the base plate when the base plate is not affixed to the electrical bus.

14. The fuse/support assembly of claim 11, wherein the fastener structure comprises a fastener bore extending through the substrate, and wherein the electrical through-conductor comprises a metallic layer on the fastener bore.

15. The fuse/support assembly of claim 11, further including a ballast resistor mounted to the substrate and in electrical series with the fuse.

16. The fuse/support assembly of claim 11, further including an insulator extending over at least a portion of the substrate.

17. The fuse/support assembly of claim 11, wherein the external connector structure comprises a pigtail connector comprising a length of electrically conductive wire having a first end in electrical communication with the fuse and a second end having an external electrical connector.

18. A fuse/support assembly for attachment to an electrical bus, comprising:

a base plate, comprising a substrate made of an insulator and having a contact location thereon, and an electrically conductive path on a second side of the substrate, the electrically conductive path extending between the contact location and a second location, the electrically conductive path including the contact location on the second side of the substrate positioned such that an engagement of the base plate to the electrical bus by the threaded fastener presses the contact location against the surface of the electrical bus to establish an electrically conductive contact therebetween;

a fastener structure which brings the contact location of the electrically conductive path into contact with the electrical bus;

an external connector structure; and a fuse supported on the second side of the substrate and having a first end in electrical communication with the external connector and a second end in electrical communication with the second location of the electrically conductive path.

19. The fuse/support assembly of claim 18, wherein the fastener structure comprises a fastener bore extending through the substrate, and a fastener sized to extend in part through the fastener bore of the substrate.

20. The fuse/support assembly of claim 18, wherein the fastener structure includes a fastener, and a retainer for the fastener, the retainer being affixed to the base place and operable to retain the fastener in contact with the base plate when the base plate is not affixed to the electrical bus.

* * * * *